United States Patent [19]

Arons

[11] Patent Number: 4,559,191

[45] Date of Patent: Dec. 17, 1985

[54] PRODUCTION OF CERAMIC FIBERS

[75] Inventor: Richard M. Arons, Chatham, N.J.

[73] Assignee: Celanese Corporation, New York, N.Y.

[21] Appl. No.: 523,219

[22] Filed: Aug. 15, 1983

[51] Int. Cl.[4] .......................... B29C 23/00; B28B 1/00

[52] U.S. Cl. ....................................... 264/60; 264/56; 264/570; 264/345; 264/171; 264/234; 264/DIG. 19

[58] Field of Search ............... 264/DIG. 19, 221, 317, 264/56, 1.5, 50, 570, 345, 171, 234; 501/95

[56] References Cited

U.S. PATENT DOCUMENTS

| | | | |
|---|---|---|---|
| 2,517,902 | 8/1950 | Luebkeman | 264/221 |
| 3,110,545 | 11/1963 | Beasley | 264/56 |
| 3,133,133 | 5/1964 | Fairbanks | 264/317 |
| 3,136,831 | 6/1964 | Zinn | 264/317 |
| 3,607,025 | 9/1971 | Jacobsen | 501/127 |
| 3,705,223 | 12/1972 | Pearson | 501/127 |
| 3,939,241 | 2/1976 | Powell | 264/317 |
| 4,008,299 | 2/1977 | Birchall | 264/65 |
| 4,225,546 | 9/1980 | Ohno | 264/317 |
| 4,250,131 | 2/1981 | Sobel | 264/DIG. 19 |

Primary Examiner—Donald Czaja
Assistant Examiner—Hubert C. Lorin
Attorney, Agent, or Firm—Depaoli & O'Brien

[57] ABSTRACT

This invention provides a multi-step process for the preparation of ceramic fibers, such as ferrimagnetic spinel fibers which are useful in electromagnetic interaction shielding applications.

The process involves subjecting a ceramic powder-filled hollow organic fiber to isostatic pressing, and then pyrolyzing and sintering the compacted fiber to yield a ceramic fiber.

18 Claims, No Drawings

PRODUCTION OF CERAMIC FIBERS

BACKGROUND OF THE INVENTION

Ceramic fibers have received increasing attention because of new industrial demands for fibers capable of withstanding elevated temperatures without deleterious effects. The growing aerospace industry provides many applications for light and strong heat-resistant fibrous materials. Inorganic refractory fibers commonly available today in commercial quantities include graphite, alumina-silica, boron nitride and silicon carbide.

The formation of inorganic refractory fibers has required elaborate and time consuming procedures since such compounds possess high melting points which render melt spinning either impossible or extremely difficult. Procedures for the thermal formation of fibrous graphite have been proposed in which continuous cellulosic fibers or woven textile articles formed therefrom serve as the starting material. Also, generally infusible synthetic polymeric fibers, such as those formed from acrylonitrile or copolymers thereof, have served as starting materials in processes proposed for the production of fibrous graphite.

U.S. Pat. Nos. 3,270,109 and 3,271,173 disclose processes for the production of inorganic oxide monofilaments in which a precursor fiber composed of certain organometallic salts is formed and then heated to convert the same to the desired inorganic filament. Additionally, inorganic fibers such as those formed from boron or boron carbide have been prepared by the vapor deposition of the same upon a substrate, such as fine tungsten wire.

Other U.S. patents which specifically relate to production of ceramic fibers include U.S. Pat. Nos. 3,107,152; 3,116,975; 3,179,605; 3,270,109; 3,271,173; 3,285,696; 3,311,689; 3,385,915; 3,529,044; 3,760,049; 4,008,299; and 4,126,652.

Ceramic fibers also are finding new applications in the growing electronics industry. There is interest in ceramic fibers which exhibit magnetic anisotropy and high electrical resistivity.

U.S. Pat. No. 2,968,622 describes a process for the preparation of magnetic ceramic fibers which involves attenuation of a molten magnetic material into a fine filament having a mechanically oriented atomic distribution, and followed by rapid chilling thereof to freeze the oriented atomic distribution.

Magnetic ceramic fibers have a wide range of adaptability for prospective applications such as the production of transformers, inductors, switching elements, memory devices, recording heads, tapes, electromagnetic interaction shields, and the like.

Illustrative of prior art of more specific interest in connection with the present invention is U.S. Pat. No. 3,003,223 which describes the production of a textile filament which comprises a metal core and an adherent oriented sheath of synthetic linear polymer.

U.S. Pat. No. 3,075,242 describes a spinneret for the production of hollow polymeric fibers.

U.S. patents which relate to hollow core fibers or composites comprising a polymeric sheath and a core filling usually containing inorganic material include U.S. Pat. Nos. 2,566,441; 3,458,615; 3,500,498; 3,568,249; 3,613,170; 3,875,008; 4,222,977; 4,375,779; and references cited therein.

There remains a need for new and improved processes for the production of inorganic fibers. There is further need for novel magnetic ceramic fibers which can meet specifications for applications such as electromagnetic interaction shielding.

Accordingly, it is an object of this invention to provide an improved process for the production of inorganic fibers.

It is another object of this invention to provide a process for the production of ferrimagnetic spinel fibers.

It is a further object of this invention to provide novel composite fibers comprising a polymeric sheath and a high density ceramic powder core.

Other objects and advantages of the present invention shall become apparent from the accompanying description and examples.

DESCRIPTION OF THE INVENTION

One or more objects of the present invention are accomplished by the provision of a process for the production of a ceramic fiber which comprises (1) providing an organic polymer hollow core fiber which is filled with ceramic powder; (2) submerging the fiber in a fluid medium which is non-permeating and inert to the organic polymer sheath of the filled hollow core fiber, and applying hydrostatic pressure to the fiber to achieve isostatic compacting of the fiber and the ceramic powder filling content; and (3) heating the compacted fiber to pyrolyze the organic polymer content, and sinter the ceramic powder content to form a ceramic fiber.

In another embodiment, the present invention provides a process for the production of a ceramic fiber which comprises (1) forming a hollow core fiber which has a microporous organic polymer sheath and which has a lumen filled with a slurry of a ceramic powder in a liquid medium; (2) heating the fiber under conditions sufficient to purge the slurry liquid medium from within the lumen of the fiber, and subsequently heating the fiber under conditions sufficient to heat-seal the microporosity of the organic polymer sheath; (3) submerging the fiber in a fluid medium which is non-permeating and inert to the organic polymer sheath of the filled hollow core fiber, and applying hydrostatic pressure to the fiber to achieve isostatic compacting of the fiber and the ceramic powder filling content; and (4) heating the compacted fiber to pyrolyze the organic polymer content, and sinter the ceramic powder content to form a ceramic fiber.

In another embodiment, the present invention provides a novel fiber composition comprising an organic polymer sheath and a ceramic powder core, wherein the fiber composition has a density of at least about three grams per cubic centimeter.

In another embodiment, the present invention provides a novel fiber composition comprising an organic polymer sheath and a ceramic powder core, having a fiber density of at least about three grams per cubic centimeter, wherein the ceramic powder comprises particulate ferrite having an average particle size less than about 1000 Angstroms, and corresponding to the formula:

$$M_1Fe_2O_4$$

where M is manganese, iron, cobalt, nickel, copper, zinc, cadmium, magnesium, barium, strontium, or any combination thereof.

In a further embodiment, the present invention provides a ceramic fiber having a density of at least about four grams per cubic centimeter, which is produced by pyrolyzing and sintering a fiber composition comprising an organic polymer sheath and a ceramic powder core, wherein the starting fiber composition has a density of at least about three grams per cubic centimeter.

The term "fiber" refers to a thread-like or monofilament structure having a length at least about 30 times its diameter.

The term "ceramic" refers to a sinterable metal oxide, nitride, boride, or carbide substrate.

The term "sinter" refers to a fusion and bonding of inorganic particles to form a monolithic structure.

The term "fluid medium" refers to both liquid and gas media.

The term "particle size" refers to the average diameter of a solid particle.

The term "microporous" refers to an organic polymer sheath which exhibits a measurable degree of permeability to gas and liquid media.

Hollow Fiber With Ceramic Core

Procedures for preparing hollow fibers which contain a core filling are described in prior art such as U.S. Pat. Nos. 2,566,441 and 4,222,977.

One convenient method involves the extrusion of an organic polymer tube which surrounds a simultaneously extruded core of a different composition. For example, two different spinning dope compositions, each having a room temperature viscosity range between about 100–3000 poises, are simultaneously extruded to form a hollow fiber sheath and filled core composite.

The sheath-forming organic polymer can be dissolved in a solvent such as dimethylformamide or dimethylsulfoxide to form a spinning dope composition. Alternatively, in some cases the organic polymer can be extruded in the molten state.

Suitable organic polymers for the sheath component of the hollow core fiber include polyamides, polyesters, polyvinyl halides, polyolefins, cellulosic esters and ethers, polyvinyl esters, polyurethanes, polysulfones, polycarbonates, polyalkylene oxides, polysulfides, polyvinyl aldehydes, polybenzimidazoles, and corresponding copolymers, block interpolymers, and blends of the above listed types of resins.

The core-forming spinning composition, i.e., the composition that corresponds to the internal forming extrudant, is usually comprised of a fluid carrier component which contains a dispersion of a ceramic powder component.

Illustrative of ceramic powders which are sinterable for purposes of the present invention are alumina, silica, alumina-silica, thoria-silica, zirconia-silica, alumina-chromia, titania, ferrite, silicon carbide, silicon nitride, titanium diboride, and the like.

There are two aspects of the internal core-forming extrudant which are essential for purposes of the present invention. First, the content of the ceramic powder should be as high as possible, e.g., a ceramic powder content of at least 70 weight percent, and preferably at least 80 weight percent. Second, the particle size of the ceramic particle should be as fine as possible, e.g., an average particle size less than about one micron, and preferably less than about 1000 angstroms. If the ceramic powder weight percent of the core-forming extrudent is less than about 70 weight percent, and/or if the average particle size of the ceramic powder is greater than about one micron, then the resultant hollow core fiber does not exhibit the optimal high density and other properties desired in the fiber structure.

The carrier component for the dispersed ceramic powder can be an organic liquid such as glycerol, polyethylene glycol, or a low molecular weight polymer such as polyvinyl alcohol. The dispersion or slurry can contain other additives such as surfactants (e.g., sorbitan monopalmitate) or plasticizers (e.g., dimethyllauramide).

In general, the hollow core fiber formation can be accomplished with either wet or dry spinning techniques. In the case of wet spinning, the fiber extruded from the spinneret is contacted with a coagulation bath. The coagulation medium can be essentially any non-solvent for the sheath-forming polymer. Convenient coagulating media include water, methanol, propanol, ethylene glycol, and the like. The temperature of the coagulating bath usually will be in the range between about 0°–95° C.

In a typical procedure, a polymer such as polyacrylonitrile is dissolved in a solvent (e.g., 20 grams of polymer in 100 milliliters of dimethylsulfoxide), and the solution is extruded through the external portion of a double orifice spinneret. Simultaneously, a ceramic powder dispersion is extruded through the internal portion of the orifice. The dispersion can consist, for example, of ferrite powder (70 weight percent), ethylene glycol (19.5 weight percent) and ammonium oleate (0.5 weight percent).

The hollow fiber containing an internal extrudant core is coagulated in a water bath or similar coagulating medium. The resultant fiber can be washed and dried in preparation for the subsequent processing steps.

A typical fiber in the green stage can have an external diameter of 0.2 millimeters and an internal diameter of 0.18 millimeters. An average density will be about two grams per cubic centimeter. A green fiber can be drawn down to a smaller diameter, such as 100 microns or less. For textile applications, fiber filaments as spun can have a denier of about 20–4000, and the drawn fiber filaments can have a denier of about 2–2000.

The type of ferrite-filled polyacrylonitrile fiber previously described above has a sheath which is microporous, i.e., it is permeable to gases and low molecular weight liquids. If the fiber is subjected to heat treatment at about 150° C. (e.g., under vacuum), light weight components such as ethylene glycol are purged from the ferrite-filled core of the hollow fiber.

After the purging treatment is completed, preferably the fibers are subjected to a subsequent heat treatment to anneal the fiber so as to heat-seal the microporosity of the organic polymer sheath. Depending on the type of organic polymer sheath, the annealing is conducted at a temperature between about 200°–500° C. for a period between about 0.5–10 hours.

It is further advantageous to seal the ends of each fiber before it is subjected to the hydrostatic compacting step.

Compacting Of Hollow Core Fiber

As a further essential step, a green ceramic powder-filled hollow core fiber as illustrated above is subjected to hydrostatic pressure to achieve isostatic compacting of the fiber and its contents. This is accomplished by submerging the fiber in a fluid medium, and applying pressure to the fluid medium in a closed system.

Hydrostatic pressing is described in technical literature such as "Treatise On Materials Science And Technology" Volume 9, Academic Press, New York, 1976 (pages 135-151).

Hydrostatic (isostatic) pressing is a technique which is an application of Pascal's Law, i.e., when pressure on a liquid in a closed container is increased or decreased, the pressure change occurs throughout the liquid. By analogy to the present invention, when powdered material is loaded into a flexible air-tight container, and the container is placed in a closed vessel filled with liquid to which pressure is applied, the powdered material receives the force of the applied pressure uniformly over its surface area. The powdered material is compacted in all directions and retains the general shape of the flexible container (e.g., a hollow fiber filled with ceramic powder).

U.S. patents relating to isostatic pressing equipment and procedures include U.S. Pat. Nos. 3,319,292; 3,577,635; 3,608,026; 3,613,157; 3,869,233; 3,956,452; 4,000,235; and 4,056,347. Cold isostatic pressing is the process most commonly utilized in the ceramic industry.

Relatively simple equipment is employed to accomplish isostatic pressing. Such equipment generally comprises a pressure vessel with a closure that can be opened to permit insertion of a mold or tooling; a pressure-generating system that develops the appropriate pressure; a reservoir sufficiently large to contain the pressure transmitting medium; a safety system to prevent excessive pressure buildup; and a control system that will allow the proper sequencing of operation.

Pressures employed in ceramic fabrication by isostatic pressing typically are in the range between about 1000-30,000 psi, and can be as high as 60,000 psi. Fluids commonly used to transmit pressure are glycerol, water and hydraulic oil.

For purposes of the present invention process, the hydrostatic fluid can be any liquid medium which is chemically inert and non-permeating with respect to the external sheath surface of a submerged ceramic powder-filled hollow fiber being compacted. In the case where a fiber sheath is microporous, as an alternative to heat-sealing of the microporosity before isostatic pressing, a hydrostatic medium can be selected which is of a sufficiently high molecular weight so as not to permeate the microporous sheath. Illustrative of this type of hydrostatic media are liquid molecular range polymers such as polyvinyl alcohol. As another alternative, sheath microporosity can be sealed by coating the fiber surface with a flexible non-porous coating, e.g., a coating of polyvinyl chloride or polyvinyl acetate.

Isostatic pressure conditions are selected which are sufficient to achieve a maximum degree of compacting for a particular ceramic powder-filled hollow fiber. High packing density enhances the sintering properties of the ceramic-powder core of the hollow fiber.

A green ceramic powder-filled hollow fiber provided in step(1) of the present invention process normally will have a density between about 1-3 grams per cubic centimeter. After isostatic pressing, the density normally will be in the range between about 2.5-4 grams per cubic centimeter.

Ceramic Fiber Formation

A present invention ceramic fiber after the sintering cycle will have a density of at least about 4 grams per cubic centimeter, and preferably a density of at least 5 grams per cubic centimeter.

Generally the thermal treatment of the compacted ceramic powder-filled hollow fiber is conducted in stages. For example, the first stage can be an initial pyrolysis at a temperature between about 200°-600° C. in an inert atmosphere, followed by pyrolysis at the same temperature in a molecular oxygen-containing atmosphere. The temperature is maintained below the sheath polymer melting point during the initial phase of the thermal treatment in order to maintain the integrity of the fiber structure.

A ceramic fiber is obtained by subjecting the previously pyrolyzed fiber to a sintering temperature between about 800°-2500° C., usually at a temperature between about 1000°-2000° C. in an oxidizing atmosphere, for a period sufficient to impart the desired ceramic fiber structure and properties.

The thermal treatment can be performed in an autoclave by heating to the required temperature/time schedule. A continuous thermal treatment can be accomplished by the continuous passage of a compacted fiber through a heated chamber or calcining furnace. The fibrous structure of the fiber is retained throughout the thermal treatment step. There is a tendency for the fiber to shrink while undergoing thermal treatment.

Utility Of Ceramic Fibers

The properties and end-uses of ceramic fibers are described in U.S. Pat. Nos. 3,709,706; 3,793,041; 3,909,278; 4,047,965; 4,125,406; 4,166,147; 4,375,779; and references cited therein.

A ferrite ceramic fiber provided in accordance with the present invention is particularly suitable for the production of textile fabrics which are excellent for electromagnetic interaction shielding applications. Exceptional ferrimagnetic properties are exhibited by a nickel-zinc ferrite spinel fiber in which the gram-atom ratio of nickel/zinc/iron is about 0.7:0.3:2.

The crystallography and magnetic structures of spinel ferrites is detailed on pages 991-998 in "Introduction to Ceramics" by W. D. Kingery, H. K. Bowen, and D. R. Uhlmann, Second Edition (John Wiley & Sons 1976).

The following Examples are further illustrative of the present invention. The specific ingredients and processing parameters are presented as being typical, and various modifications can be derived in view of the foregoing disclosure within the scope of the invention.

EXAMPLE I

This example illustrates the synthesis of ferrimagnetic nickel-zinc ferrite powder having the composition $Ni_{0.7}Zn_{0.3}Fe_3O_4$, which is suitable for the production of ceramic fibers in accordance with the present invention.

A 630.2 gram quantity of $Fe(acetylacetonate)_3$ (1.78 moles), and 182.9 grams of $Ni(acetylacetonate)_2.2H_2O$ (0.62 mole), and 80.2 grams of $Zn(acetylacetonate)_2.2H_2O$ (0.27 mole) are dissolved in 3 liters of tetrahydrofuran contained in a round-bottom flask equipped with a condenser, stirrer, and dropping funnel.

The metal acetylacetonate solution is refluxed for one hour with stirring, and then the solution is cooled to room temperature. A 500 milliliter quantity of concentrated aqueous ammonia (28-30%) is added dropwise to the metal acetylacetonate solution over a period of 0.7-1 hour. The rate of addition is controlled to prevent a boil-over during the exothermic gelling reaction.

The gelled solution is refluxed for one hour, and then the solvent is stripped off to provide a solid phase spinel precursor. The spinel precursor is loaded into an alumina boat and pyrolyzed in a furnace at 500° C. under an inert atmosphere of nitrogen gas. When the evolution of volatile material has ceased (about 15–20 minutes), the resultant char is ground to a fine powder with a mortar and pestle or a ball mill. The fine powder is reloaded into an alumina boat, and the material is pyrolyzed for 15–20 minutes at 600° C. in an environment of molecular oxygen. The resultant brown powder is a ferrimagnetic spinel.

The average particle size as determined by Scanning Electron Microscope measurements is less than about 1000 angstroms. About 110 grams of ferrimagnetic spinel product is obtained, which corresponds to a yield of 50–55 weight percent.

EXAMPLE II

This Example illustrates the preparation of a ceramic fiber in accordance with the present invention.

A ferrite slurry is prepared by dispersing ferrite powder of the Example I type in triethylene glycol, using a Cowles mixing head attached to a high speed agitator to yield a smooth slurry containing 52.4 weight percent ferrite. The slurry is then devolatalized by heating the mixture to 220° C. for 0.5 hour. After cooling, the slurry is filtered through a 325 mesh screen using a zenith metering pump.

Hollow fibers containing the ferrite slurry are spun from a hollow fiber spinneret of the double orifice type which permits simultaneous extrusion of two liquid or melt streams. Polyethylene melt from a conventional melt extruder is delivered to the spinneret at a melt temperature of 204° C. to form a microporous sheath, while ferrite slurry is injected into the core via the inner orifice of the double orifice spinneret.

The resultant composite fiber is drawn through a methanol bath to extract the triethylene glycol through the semipermeable polyethylene sheath. The fiber is then dried by heating in vacuum at 100° C.

The fiber is placed in a cold isostatic press and hydrostatically compressed employing silicone oil as the working fluid. The silicone oil has a high molecular weight which prevents it from permeating the sheath of the fiber. The hydrostatic pressure on the fiber is raised to 30,000 psi and then released.

The compressed fiber is loaded into an electrically heated furnace and heated in air up to 1200° C., and held at temperature for 20 hours. The heat treatment burns off all organic materials and sinters the composite to a ceramic fiber having a density of about 4.5 grams per cubic centimeter.

What is claimed is:

1. A process for the production of a ceramic fiber which comprises (1) providing an organic polymer hollow core fiber which is filled with ceramic powder; (2) submerging the fiber in a fluid medium which is non-permeating and inert to the organic polymer sheath of the filled hollow core fiber, and applying hydrostatic pressure to the fiber to achieve isostatic compacting of the fiber and the ceramic powder filling content; and (3) heating the compacted fiber to pyrolyze the organic polymer content, and sinter the ceramic powder content to form a ceramic fiber.

2. A process in accordance with claim 1 wherein the organic polymer sheath of the hollow core fiber in step(1) comprises a polyamide.

3. A process in accordance with claim 1 wherein the organic polymer sheath of the hollow core fiber in step(1) comprises a polyester.

4. A process in accordance with claim 1 wherein the organic polymer sheath of the hollow core fiber in step(1) comprises a polyvinyl halide.

5. A process in accordance with claim 1 wherein the organic polymer sheath of the hollow core fiber in step(1) comprises a polyolefin.

6. A process in accordance with claim 1 wherein the organic polymer sheath of the hollow core fiber in step(1) comprises a cellulosic polymer.

7. A process in accordance with claim 1 wherein the ceramic powder in step(1) comprises alumina.

8. A process in accordance with claim 1 wherein the ceramic powder in step(1) comprises silica.

9. A process in accordance with claim 1 wherein the ceramic powder in step(1) comprises alumina-silica.

10. A process in accordance with claim 1 wherein the ceramic powder in step(1) comprises thoria-silica.

11. A process in accordance with claim 1 wherein the ceramic powder in step(1) comprises zirconia-silica.

12. A process in accordance with claim 1 wherein the ceramic powder in step(1) comprises alumina-chromia.

13. A process in accordance with claim 1 wherein the ceramic powder in step(1) comprises titania.

14. A process in accordance with claim 1 wherein the ceramic powder in step(1) comprises ferrite.

15. A process in accordance with claim 1 wherein the ceramic powder in step(1) comprises ferrimagnetic spinel.

16. A process in accordance with claim 1 wherein the fluid medium comprises water.

17. A process in accordance with claim 1 wherein the fluid medium comprises an organic liquid.

18. A process for the production of a ceramic fiber which comprises (1) forming a hollow core fiber which has a microporous organic polymer sheath and which has a lumen filled with a slurry of a ceramic powder in a liquid medium; (2) heating the fiber under conditions sufficient to purge the slurry liquid medium from within the lumen of the fiber, and subsequently heating the fiber under conditions sufficient to heat-seal the microporosity of the organic polymer sheath; (3) submerging the fiber in a fluid medium which is non-permeating and inert to the organic polymer sheath of the filled hollow core fiber, and applying hydrostatic pressure to the fiber to achieve isostatic compacting of the fiber and the ceramic powder filling content; and (4) heating the compacted fiber to pyrolyze the organic polymer content, and sinter the ceramic powder content to form a ceramic fiber.

* * * * *